Patented June 6, 1950

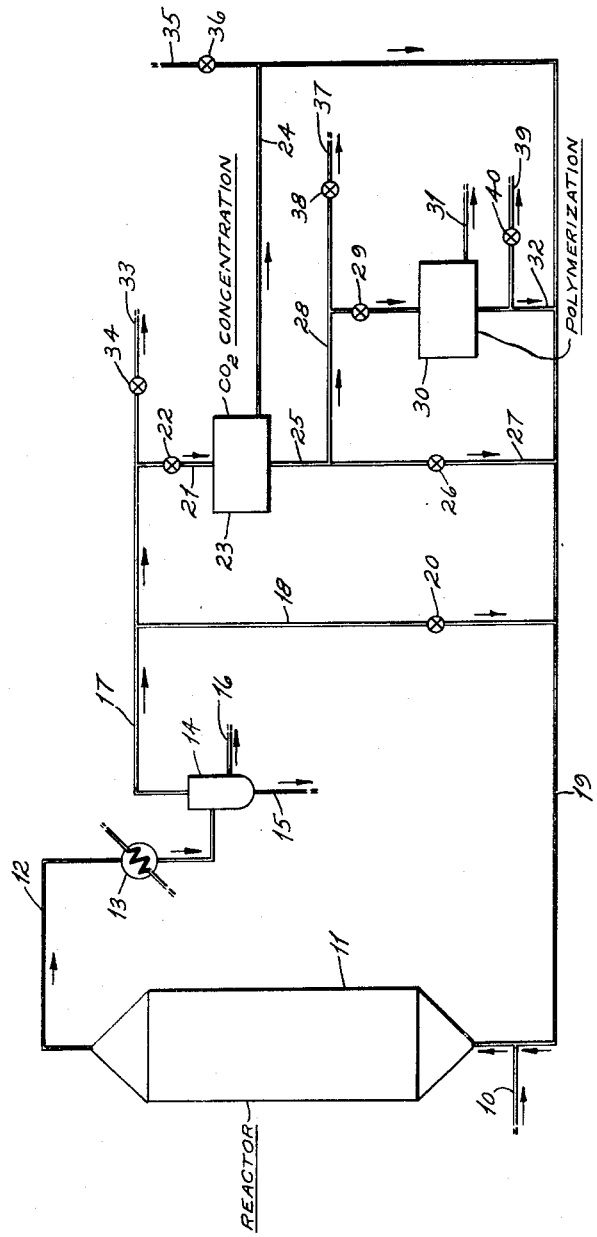

2,510,096

UNITED STATES PATENT OFFICE 2,510,096

SYNTHESIS OF HYDROCARBONS AND OXYGENATED HYDROCARBONS

Walter G. Frankenburg, Millersville, Pa., and Edwin T. Layng, New York, N. Y., assignors to Hydrocarbon Research, Inc., New York, N. Y., a corporation of New Jersey Application January 11, 1947, Serial No. 721,538

13 Claims. (Cl. 260—449.6)

The present invention relates to the catalytic reduction of carbon oxide with hydrogen and is more particularly concerned with the manufacture of hydrocarbons and related compounds under conditions of good yield and uninterrupted operation.

The present invention contemplates the catalytic manufacture of hydrocarbons, particularly normally liquid hydrocarbons, in the presence of an iron catalyst and with a relative proportioning of reactant feed gases such that the net production of undesired by-products, such as carbon dioxide and light gaseous hydrocarbons, is materially suppressed or inhibited.

In carrying out the present invention, a reactant stream containing carbon monoxide and hydrogen is passed in contact with a fluidized mass of iron catalyst in solid particle form maintained within a reaction zone under predetermined conditions of temperature and pressure, such that at least the major portion of, say at least about 75% of, and preferably at least about 95% of, the carbon monoxide is converted to products of reaction comprising mainly normally liquid compounds. Advantageously the conversion of carbon monoxide per pass through the reaction zone is limited so that a small, but critical amount of carbon monoxide, i. e. at least about 1 and preferably about 2 mol percent, remains in the effluent stream from the reaction zone. In other words conditions are maintained in the reaction zone such that slightly less than complete conversion of carbon monoxide is secured in passing through the reaction zone.

In accordance with the invention, the composition of the reactant mixture initially passing into contact with the catalyst is maintained such that there is relatively small but limited content of carbon monoxide; a very minor proportion, preferably as low as practical, of water vapor; a high ratio of hydrogen to carbon monoxide, preferably substantially greater than 2.5 to 1; and sufficient carbon dioxide, usually greater than about 15 mol percent, capable in combination with the foregoing of suppressing net formation of carbon dioxide.

As indicated in the copending application Serial No. 717,313, filed December 19, 1946, in the name of Edwin T. Layng, one of the coinventors herein, operating the reactor so that the effluent stream retains at least about 1%, preferably at least about 2%, carbon monoxide on the molar basis results in the elimination of objectionable carbonaceous deposits upon the catalyst. Generally, however, the effluent gases are maintained in contact with the catalyst until the carbon monoxide concentration has reached a value below about 3% on the molar basis. Carbonization of the catalyst causes catalyst deterioration and objectionable change in catalyst density with consequent adverse effect on reactor operation.

The carbon monoxide concentration of the total feed must in all cases be maintained below about 15 mol percent and obviously must be greater than that minimum proportion required to assure the presence of at least 1%, preferably at least 2%, carbon monoxide in the final gaseous effluent from the contact mass. Accordingly, this means that the initial concentration of carbon monoxide in the feed gases, allowing for typical volume contraction of the gases during reaction, is generally at least about 5% on the molar basis. All other variables remaining constant, the tendency toward suppression of carbon dioxide formation is enhanced as the initial carbon monoxide concentration is decreased from 15% toward the lower limit, although obviously the lower concentrations require a greater feed gas circulation per unit of net hydrocarbon production. Therefore, an intermediate concentration in the range of, for example, 8 to 12%, may be most desirable.

As indicated above, the total feed gas supplied to the reaction zone most advantageously contains as small a concentration of water vapor as possible. While a gas free from water vapor is ideal, as a practical matter the lower limit is usually determined by the degree of separation possible when condensing and separating at temperatures and pressures economically available. At, however, temperatures below 100° F. and pressures in the neighborhood of 250 lbs. per square inch gauge and above, the water vapor content can be limited to an inconsequential value, as for example, 0.01% to 0.1%. In any event, it is preferred that the feed gas water content be below 1% and at the outside not greater than 3%. Tendency toward net carbon dioxide formation is greater with high water vapor concentrations and decreases as water vapor is eliminated from the feed gas.

The aforementioned ratio of hydrogen to carbon monoxide in the feed gas, represents the minimum which can usually be tolerated for good results. Other conditions remaining equal, an increase in this ratio results in a corresponding tendency toward the suppression of carbon dioxide production. Accordingly, it is advantageous to use feed gases which contain at least a 3:1 ratio of hydrogen to carbon monoxide and preferably a ratio of 4:1 or 5:1 and higher.

The concentration of carbon dioxide should in all instances be above about 15%. Here again, an important effect of increased carbon dioxide concentration, per se, is to suppress net production thereof. That is to say, increased proportions above 15 mol percent, preferably above 20% are to be preferred. For example the proportion may be as high as 30 or 40 mol percent.

From the foregoing, it will be apparent that based upon the stated limits of concentration of the several reactants in the feed gas, each exerts an effect in producing the improved results desired and relative variation is permissible with this in mind. For example, with a feed gas containing a relatively high proportion of hydrogen to carbon monoxide, the concentration of carbon dioxide or the proportion of carbon monoxide may respectively be decreased or increased somewhat within the specified ranges in order to secure the final product distribution desired. So also, where the concentration of water vapor is somewhat above the preferred minimum, an increase in carbon dioxide concentration, for example, may be advisable.

The remainder, if any, of the feed gas may comprise inert gases, or gases which do not adversely alter or impair the hydrocarbon synthesis process. Also, such gases may comprise hydrocarbons recycled from the reaction process.

The use of a recycle stream affords a simple solution to the problem of providing a total reactant feed meeting the requirements of the present invention. Moreover, the presence of olefins in the recycle stream appears to be beneficial to the production of liquid hydrocarbons.

For instance, the normally gaseous products recovered from the reaction product by condensation and separation of the normally liquid products as above, may be recycled in the proper ratio with respect to the available fresh feed stream of synthesis gas in order to give a total feed meeting the foregoing requirements. Obviously, this may require separation of certain, or all, of the several normally gaseous components by conventional gas recovery means and an appropriate recycle of selected gases so separated or recovered, in such relative proportions as to provide the desired predetermined total feed composition. Reactor recycle reduces the concentration of carbon monoxide entering the reactor and usually results in a more uniform ratio of hydrogen to carbon monoxide throughout the reaction zone.

The foregoing conditions of reactant composition are particularly effective with a powdered synthesis catalyst of the iron type maintained in a state of dense phase fluidization by the upflowing reactants and maintained at a temperature in the range of about 550 to 700° F. and under a pressure in the vicinity of about 200 to 250 pounds per square inch gauge and with provision for rapid removal of the heat of reaction. The hydrocarbon product produced under these conditions has a high degree of unsaturation, excess production of light gas is avoided, and excessive carbonization of the catalyst is also avoided.

From the foregoing it is apparent that the present invention is of particular advantage in overcoming the uneconomic utilization of feed carbon in the production of undesired carbon dioxide. Thus the invention in its broadest aspect contemplates operation within a range where carbon dioxide production is lowered to an economically practical range. Considering the normal requirements of an operating process of this character, some net production of carbon dioxide is usually not objectionable and may be advantageous. For example, in a system where product gases are recycled to maintain a predetermined carbon dioxide concentration in the inlet feed there is usually some net loss of carbon dioxide with the withdrawn product gases unless resort is had to the usually uneconomic process of recovering from the product gases all of the carbon dioxide for recycle. To this extent therefore the net production of carbon dioxide may be desirable. Therefore, the invention, in its broadest aspect, contemplates some net production of carbon dioxide, maintained, however, at a relatively low and economically beneficial level.

On the other hand, the invention in a more specific aspect, permits operation with substantially no net production of carbon dioxide and may be carried out in some instances, where desirable, so as to effect net consumption of carbon dioxide. These latter objectives can be readily achieved merely by varying the concentration of the respective components of the feed gas, as indicated, in the direction of carbon dioxide suppression.

With further regard to the above mentioned advantage of suppressing net production of carbon dioxide, it is to be particularly noted that when operating with feed gas compositions within the specific range taught by the present invention the net carbon dioxide production usually never exceeds a maximum value of about 10% determined on the basis of the carbon monoxide converted in the reaction zone. For example, with a feed composition containing about 10% carbon monoxide, about 15% carbon dioxide, preferably less than 1% water vapor, and a $H_2:CO$ ratio of about 3.5:1 with a fluidized iron catalyst at predetermined optimum conditions for the predominant production of hydrocarbons in the motor gasoline boiling range, the contact time may be so adjusted as to result in a final effluent stream of gasiform products containing at least about 1%, preferably at least about 2%, carbon monoxide on the molar basis. Analysis of the product stream will establish a net proportion of $CO_2$ production not greatly variant from that desired, and adjustment can be made precisely to the desired proportion by varying the stream of feed gases in accordance with the foregoing principles. Thus working toward a maximum of about 10% net production of carbon dioxide, if the proportion of production somewhat exceeds this, the percent of carbon dioxide in the total feed contacting the catalyst may be increased, the molar concentration of carbon monoxide decreased, the water content lowered or the hydrogen to carbon monoxide ratio increased.

The same remarks apply to operations wherein a lower net production of carbon dioxide may be desired in which case it is only necessary to operate with total reactant feed composition within the foregoing range, adjusted, however, in the direction of decreased net carbon dioxide production until the desired result is achieved. In this way it is possible to operate with any selected carbon dioxide production, for instance of 5% or lower or even, as indicated above, with a net consumption of carbon dioxide.

For example, when using a typical iron catalyst in a state of dense phase fluidization at 600° F., under 200 pounds per square inch gauge pressure, and charging gas comprising 15% carbon dioxide, 5% carbon monoxide, 22% hydrogen, and about 1.0% water vapor by volume, there is no net production of carbon dioxide. Likewise substantially complete suppression of net production of carbon dioxide is realized when the charged gas comprises 20% carbon dioxide, 12% carbon monoxide, 40% hydrogen, and less than about 0.1% water vapor by volume. In each instance, the effluent gases contain about 1.5% carbon monoxide on the molar basis and the hydrocarbons recovered therefrom are predominantly of the type which are normally liquid, boiling in the gasoline range.

The present invention accordingly provides a limited range of operation within which the feed gas composition may be adjusted to control net carbon dioxide production to the most economically favorable value, as desired. Thus with upper limits of 15% for carbon monoxide and 3%, preferably 1%, for water vapor, and with lower limits of about 15% for carbon dioxide and 2.5:1 for the $H_2:CO$ ratio, it is simply necessary to adjust until the specific predetermined conditions are met. In general, though not without exception, the conditions thus determined are also favorable to the suppression of the formation of light hydrocarbon gases such as methane.

Referring more particularly to the drawing accompanying the present specification there is disclosed in more or less diagrammatic form one arrangement suitable for carrying out the present invention. In the drawing the numeral 10 represents an inlet pipe supplied from a source not shown with a synthesis gas containing, for example, about 25 mol percent of carbon monoxide, 64 mol percent hydrogen, 7 mol percent carbon dioxide and about 4% methane. As will hereinafter be shown more in detail, the precise composition of the synthesis gas is not extremely critical within broad limits since other means are available for permitting a fine degree of control in respect to the composition of the total feed ultimately supplied to the synthesis reactor. Advantageously, however, the synthesis gas is free or at least substantially free from water vapor.

The synthesis gas is fed into a synthesis reactor 11 at the lower portion thereof and passes upwardly through a mass of suitable catalyst under familiar conditions of temperature, pressure and contact such that the catalytic reaction between the hydrogen and carbon monoxide takes place. The effluent gases are drawn off through suitable filters or other separating means, not shown, by the pipe 12 and passed to a condenser 13 and a separator 14.

The condenser and separator advantageously operate under such conditions of temperature and pressure as to effect condensation and removal of all normally liquid constituents of the reaction gases. Thus water vapor is removed from the separator by way of the outlet pipe 15 and liquid hydrocarbons are withdrawn for further treatment or recovery by line 16. The normally gaseous, residual products removed overhead by pipe 17 will usually consist of carbon dioxide, light gaseous hydrocarbons and hydrogen, together with, where reaction is not complete in the synthesis reactor, a minor proportion of carbon monoxide. This product may be directly recycled to the incoming stream of synthesis gas by means of pipes 18 and 19 controlled by valve 20. For example, the recycled gas may amount to 1 to 4 volumes per volume of fresh feed gas.

On the other hand it may be advantageous and desirable to subject a portion at least of the tail gas from the pipe 17, to one or more purification or separation processes. Thus, for example, a branch pipe 21 controlled by valve 22 conducts any desired portion of the tail gas stream to a carbon dioxide absorbing unit 23. While this unit or system is illustrated only diagrammatically, it may comprise any of the conventional systems wherein the carbon dioxide contained in the gaseous stream is absorbed in a suitable solvent such as a monoethanolamine solution, and then liberated by regeneration. The gaseous hydrocarbons and hydrogen from which the carbon dioxide has been stripped leave the absorber 23 through pipe 25 whereas the carbon dioxide liberated in the regenerator section of the absorbing unit 23 leaves through a pipe 24 which passes into pipe 19 to further supplement the reactor feed gas.

Any portion of the gaseous product from the pipe 25 may also be returned directly into the incoming feed of synthesis gas through valve 26 and branch pipe 27 leading into pipe 19. On the other hand it may be advantageous to remove all or part of the hydrocarbon gases from this product. One convenient means for recovering useful hydrocarbons involves the passage of this gas through a branch pipe 28 and a valve 29 into a polymerization unit 30 wherein the olefins present in the gaseous stream are polymerized by contact with a suitable catalyst such as phosphoric acid on silica. The liquid polymer resulting from this process is withdrawn for further treatment or use through pipe 31. The residual gaseous stream comprising hydrogen and gaseous paraffins and probably nitrogen and unpolymerized olefins leaves the polymerization unit through pipe 32 for supply to the manifold pipe 19.

In the interest of a simple diagrammatic showing, the valves and other controls have been reduced to a minimum. Accordingly the invention contemplates use of such additional controls as will occur to one skilled in the art.

It will be apparent that the composition and proportioning of gases which are recycled for admixture with the incoming fresh feed synthesis gas can be controlled within relatively wide limits. Thus valve 20 may be adjusted to permit any portion of the tail gas stream to be recycled directly. Any additional proportion thereof may be treated in the carbon dioxide absorber to provide a relatively pure stream of carbon dioxide which permits the adjustment of the carbon dioxide content of the feed gas to any desired level. A third recycle stream free from carbon dioxide is available from the polymerization process.

In order to permit full control we also provide a branch outlet pipe 33 provided with a valve 34 for venting excess tail gas or for overcoming any abnormal build-up of gases accumulating in the recycle stream. So also branch pipe 35 controlled by valve 36 connects with the carbon dioxide line 24 in order to permit venting or what is probably more desirable in practice, introduction of carbon dioxide from outside sources to initially secure the level of concentration required for said operation.

So also a branch pipe 37 controlled by valve 38 connects with the pipe 25 from a carbon dioxide absorber in order to permit venting of all or any desired part of the hydrogen and hydrocarbon stream. A similar branch line 39 controlled by valve 40 permits venting of the residual hydrogen and hydrocarbon stream from the polymerization unit. From the foregoing it will be obvious to one skilled in the art that the process may be so continuously operated that the mixture of fresh feed synthesis gas and recycle gas can be maintained at that composition required for operation in accordance with the present invention.

In accordance with one specific example of the present invention, there is provided a typical reactor of cylindrical form having a filling of catalyst comprising a powdered iron catalyst of about 200–400 mesh, about 85% passing through a 325 mesh screen. The catalyst has incorporated therein by weight about 1.5% potassium oxide ($K_2O$) and 2% alumina ($Al_2O_3$) and is conditioned by use until a state of settled operation is reached. A stream of reactant gas is fed upwardly through the mass of catalyst at a linear velocity sufficient to hold the catalyst powder in a condition of dense phase fluidization, and at an overall rate of 120 standard cubic feet per hour per pound of iron. The reaction temperature is continually maintained throughout the mass of catalyst at about 607° F. by internal cooling surfaces immersed in the catalyst. The pressure is 235 lbs. per square inch gauge.

The total feed gas fed to the reactor has the following composition:

| | |
|---|---|
| $H_2$ | 19.4 mol percent |
| CO | 6.4 mol percent |
| $CO_2$ | 22.4 mol percent |
| $H_2O$ | Less than 0.1% |
| Remainder | Normally gaseous hydrocarbons with about 3.3% nitrogen |

The total feed is derived in the present instance by condensing and separating normally liquid components of the reactor effluent at a temperature of about 100° F. and a pressure of about 235 pounds per square inch gauge and recycling the normally gaseous products of reaction into a typical fresh feed synthesis gas in the ratio of 5.6:1. The effluent gases are filtered to remove entrained particles of catalyst and the products recovered with a net yield of about 9% carbon dioxide based on the total carbon monoxide consumed. The yield of hydrocarbons, including 3% oxygenated hydrocarbons, on the same basis, amounts to about 91%. The hydrocarbon products are predominantly of normally liquid character, boiling within the motor gasoline range and highly unsaturated.

Somewhat similar results are achieved where the total feed includes less than 0.1% water, the carbon monoxide concentration is about 13%, the hydrogen concentration is raised to about 40.0%, and the carbon dioxide about 18%. This presupposes the same operating conditions as previously. Where the reaction temperature is reduced to 600° F. or thereabouts but the other conditions remain unchanged, the net production of carbon dioxide will increase in a very minor respect, but can readily be adjusted as above by a relatively minor increase in $CO_2$ concentration, increase in $H_2$:CO ratio, decrease in CO content in the feed, or combination thereof.

In accordance with another example using the same equipment, catalyst and reaction conditions as above, there is substituted a total feed gas of the following composition:

| | |
|---|---|
| $H_2$ | 20.3 mol percent |
| CO | 5.3 mol percent |
| $CO_2$ | 26.7 mol percent |
| $H_2O$ vapor | Less than 0.1% |
| Remainder | Normally gaseous hydrocarbons with about 3.2% nitrogen |

In accordance with this example, conditions approximate those in the earlier example, except that average temperature is about 618° F. and pressure is 205 pounds per square inch gauge. The effluent gaseous reaction products withdrawn contain on molar basis about 1.2% of carbon monoxide, and yield about 97.0% of $C_3$ and heavier hydrocarbons on the basis of the carbon monoxide converted. There is in addition a yield of about 10% of $C_1$ and $C_2$ hydrocarbons, and about 5.0% of water soluble oxygenated compounds.

It is particularly important to note that in this example the high yields are accounted for by an actual net consumption of carbon dioxide, corresponding to about 12% of the carbon monoxide converted.

As previously indicated, any intermediate predetermined net carbon dioxide production intermediate between those disclosed by the foregoing illustrative examples, is obtainable by appropriate adjustment of the feed gas stream composition in accordance with the foregoing principles.

It is important to note that the foregoing examples are subject to some variation in degree depending upon the specific type of catalyst and reaction technique employed, as well as the pressure and the temperatures prevailing. In any event, however, the variation is relatively minor and can readily be determined in accordance with the foregoing principles by a series of preliminary test operations.

In particular, variation in temperature of the reaction assumes some special significance. Thus while the present catalytic process is operative generally within the range of 550 to 700° F. using iron catalysts, a temperature of about 600 to 650° F. is usually requisite for the production of hydrocarbons predominately in the gasoline boiling range.

In general, as temperatures are increased, the tendency toward net carbon dioxide production decreases somewhat. Stated in another way, a decrease in synthesis temperature imposes some limitation on the synthesis gas composition where any predetermined carbon dioxide production or consumption is to be maintained. Under such conditions it will be seen that when the temperature is lowered it may be necessary to readjust conditions by increasing carbon dioxide content, decreasing the carbon monoxide content, increasing the $H_2$:CO ratio, or by combinations thereof. For example, in changing a reactor temperature from 650 to 600° F., a minor increase in the content of carbon dioxide in the feed gas will usually serve to maintain the same net carbon dioxide production.

If, however, the molar percentage requirement of carbon dioxide becomes excessive it is possible to readjust the carbon monoxide molar percentage downwardly or to increase the $H_2$:CO ratio upwardly, or to resort to both of these expedients in order to secure a condition under which the molar proportion of carbon dioxide produced will be limited to the predetermined figure.

As indicated above, the present invention is broadly applicable to the various types of catalyst contact technique with which we are aware using iron type catalysts and may be applied to operation either in a single stage or a plurality of stages in series with or without intermediate condensation and removal of water vapor and/or hydrocarbon products. Furthermore as indicated above, the exact composition of the fresh feed synthesis gas is not normally critical since the recycle stream permits adjustment of the fresh feed gases to any reasonable total feed gas composition. Thus, it has been our experience that the tail or recycle gases normally contain a substantially higher $H_2:CO$ ratio than the original feed gases and, as clearly shown, are low in carbon monoxide content, permitting wide latitude in controlling such characteristics in the total feed gas.

It is to be noted that the term hydrocarbons as used herein is intended also to include the oxygenated hydrocarbon compounds usually inevitably formed to some proportion but capable of being produced in predetermined proportion, where desired, by an appropriate increase in pressure as is fully known. The invention accordingly contemplates any conventional variation in reaction pressure and temperatures suitable and appropriate to vary the product distribution in view of the specific products required. Moreover, the invention contemplates the use of iron catalysts in substantially any familiar form whether in the condition of metallic particles or whether supported upon any suitable carriers such as diatomaceous earth, silica gel or the like.

Obviously many modifications and variations of the invention as set forth above may be made without departing from the spirit and scope thereof and therefore only such limitations should be imposed as are indicated in the appended claims.

I claim:

1. In the production of hydrocarbons, oxygenated hydrocarbons and the like by the catalytic reduction of a carbon oxide with hydrogen wherein a continuous stream of reactant gas containing substantial proportions of hydrogen, carbon monoxide and carbon dioxide is passed in contact with an iron synthesis catalyst under predetermined conditions of reaction, including an elevated temperature effective to form said product compounds, a substantial conversion of carbon monoxide into said compounds is effected, and the effluent products of reaction are withdrawn from the catalyst, the improvement which comprises regulating the said stream of reactant gas supplied to the catalyst to a composition containing at least about 15% of carbon dioxide, not more than about 15% of carbon monoxide, less than 1% of water vapor, and having a $H_2:CO$ ratio of at least 3:1.

2. In the production of hydrocarbons, oxygenated hydrocarbons and the like by the catalytic reduction of a carbon oxide with hydrogen wherein a continuous stream of reactant gas containing substantial proportions of hydrogen, carbon monoxide and carbon dioxide is passed in contact with an iron synthesis catalyst under predetermined conditions of reaction, including an elevated temperature effective to form said product compounds, a substantial conversion of carbon monoxide into said compounds is effected, and the effluent products of reaction are withdrawn from the catalyst, the improvement which comprises regulating the said stream of reactant gas supplied to the catalyst to a composition containing at least about 15% of carbon dioxide, not more than about 15% of carbon monoxide, not more than 3% of water vapor, and having a $H_2:CO$ ratio of not less than 2.5:1.

3. In the production of hydrocarbons, oxygenated hydrocarbons and the like by the catalytic reduction of a carbon oxide with hydrogen wherein a continuous stream of reactant gas containing substantial proportions of hydrogen, carbon monoxide and carbon dioxide is passed in contact with an iron synthesis catalyst under predetermined conditions of reaction, including an elevated temperature in the range of about 550–700° F. effective to form said product compounds, a substantial conversion of carbon monoxide into said compounds is effected, and the effluent products of reaction are withdrawn from the catalyst, the improvement which comprises regulating the said stream of reactant gas supplied to the catalyst to a composition containing from about 5 to about 15% carbon dioxide, not more than about 15% of carbon monoxide, not more than 0.1% of water vapor, and having a $H_2:CO$ ratio of at least about 3:1.

4. The process defined in claim 3 wherein the hydrocarbons produced are normally liquid compounds produced at an elevated temperature of about 600–650° F.

5. In the production of hydrocarbons, oxygenated hydrocarbons, and the like by catalytic reduction of carbon oxide with hydrogen, the process comprising continuously passing a stream of reactant gas containing substantial proportions of hydrogen, carbon monoxide and carbon dioxide in contact with a fluidized iron catalyst at a temperature in the range of about 550 to 700° F. and under a gauge pressure in the range of about 200 to 250 pounds per square inch within a reaction zone, maintaining the reactant composition supplied to the catalyst such that the carbon dioxide content is at least 15 mol percent, the carbon monoxide content does not exceed about 15 mol percent, the water vapor content is not in excess of about 3 mol percent, and the hydrogen amounts to at least 2.5 mols per mol of carbon monoxide, effecting conversion of at least a major proportion of the carbon monoxide into said product compounds, and removing from the reaction zone an effluent stream containing said product compounds.

6. A process according to claim 5 in which the concentration of carbon dioxide in the reactant feed is maintained sufficiently high so that there is substantially no net production of carbon dioxide.

7. The process according to claim 5 in which the concentration of carbon dioxide in the reactant feed is maintained sufficiently high so that the net production of carbon dioxide is less than about 10% of the converted carbon monoxide.

8. In the production of hydrocarbons, oxygenated hydrocarbons and the like by catalytic reduction of carbon oxide with hydrogen, a process comprising passing a stream of reactant gas containing substantial proportions of hydrogen, carbon monoxide and carbon dioxide in contact with an iron synthesis catalyst in a reaction zone maintained under superatmospheric pressure and at a temperature in the range about 550 to 700° F., effective to form said product compounds, maintaining the composition of said stream of reactant gas such that the carbon dioxide content is at least about 15 mol percent, the carbon monoxide content does not exceed about 15 mol percent, the water vapor content is not in excess of about 3 mol percent and the ratio of hydrogen to carbon monoxide is at least 2.5:1, and such that the net carbon dioxide produced is less than about 10% of the converted carbon monoxide, effecting conversion of at least a major proportion of the carbon monoxide into said product compounds, and removing from the reaction zone an effluent stream containing said product compounds.

9. The process according to claim 8 in which the water content of the stream of reactant gas passing into the reaction zone does not exceed about 1 mol percent.

10. The process according to claim 8 in which the effluent products of reaction are withdrawn from the reaction zone after a contact time such that the effluent stream contains at least about 1% carbon monoxide on the molar basis.

11. In the production of hydrocarbons, oxygenated hydrocarbons and the like by catalytic reduction of carbon oxide with hydrogen, the process comprising passing a stream of reactant gas containing substantial proportions of hydrogen, carbon monoxide and carbon dioxide in contact with a fluidized iron syntheses catalyst in a reaction zone at a temperature in the range of about 550 to 700° F. and under a pressure in the range 200 lbs. per sq. in. gauge and higher, maintaining the composition of said stream of reactant gas such that the carbon dioxide content is at least about 15 mol percent, the carbon monoxide content does not exceed about 15 mol percent, the water vapor content is not in excess of about 3 mol percent and the ratio of hydrogen to carbon monoxide is at least 2.5:1 and such that the net production of carbon dioxide is substantially suppressed, effecting conversion of at least a major proportion of the carbon monoxide into said product compounds, and removing from the reaction zone an effluent stream containing said product compounds.

12. The process according to claim 11 in which the water content of the stream of reactant gas passing into the reaction zone does not exceed about 1 mol percent.

13. The process according to claim 11 in which the effluent products of reaction are withdrawn from the reaction zone after a contact time such that the effluent stream contains at least about 1% carbon monoxide on the molar basis.

WALTER G. FRANKENBURG.

REFERENCES CITED

The following references are of record in the file of this patent:

UNITED STATES PATENTS

| Number | Name | Date |
|---|---|---|
| 1,984,380 | Odell | Dec. 18, 1934 |
| 2,244,196 | Herbert | June 3, 1941 |
| 2,248,099 | Linckh et al. | July 8, 1941 |
| 2,251,554 | Sabel et al. | Aug. 5, 1941 |
| 2,301,687 | Dorschner | Nov. 10, 1942 |
| 2,434,537 | Barr et al. | Jan. 13, 1948 |
| 2,436,957 | Eastman | Mar. 2, 1948 |

FOREIGN PATENTS

| Number | Country | Date |
|---|---|---|
| 6,476 | Great Britain | Dec. 10, 1914 |

OTHER REFERENCES

Chem. Met. Eng., Jan. 1946, pages 220, 222, 224 (3 pages).